(12) United States Patent
Sato et al.

(10) Patent No.: US 6,305,426 B1
(45) Date of Patent: Oct. 23, 2001

(54) EXPANSION TUBE JOINT AND ASSEMBLING METHOD THEREOF

(75) Inventors: Taichi Sato, Nagaokakyo; Yasushi Fujita, Hyogo-ken, both of (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 0 days.

(21) Appl. No.: 09/392,923

(22) Filed: Sep. 9, 1999

(30) Foreign Application Priority Data

Jul. 27, 1999 (JP) .................................................. 11-211949

(51) Int. Cl.7 ............................... F16L 11/18; F16L 27/12
(52) U.S. Cl. ........................ 138/120; 138/114; 138/155; 285/302; 285/31; 285/145.3; 285/145.4; 285/123.13; 285/402
(58) Field of Search ..................................... 138/120, 155, 138/113, 114; 285/31, 145.3, 145.4, 402, 302, 123.12

(56) References Cited

U.S. PATENT DOCUMENTS

| | | | |
|---|---|---|---|
| 2,521,127 | * | 9/1950 | Price ..................................... 285/302 |
| 3,684,320 | * | 8/1972 | Platzer et al. ........................... 285/81 |
| 4,097,074 | * | 6/1978 | Nagao et al. .......................... 285/231 |
| 4,116,478 | * | 9/1978 | Yamaji et al. ......................... 285/302 |
| 4,296,953 | * | 10/1981 | Nagao et al. .......................... 285/302 |
| 5,002,318 | * | 3/1991 | Witter .................................... 285/302 |
| 5,613,714 | * | 3/1997 | Toshima et al. ....................... 285/321 |
| 5,897,146 | * | 4/1999 | Saito et al. ............................ 285/302 |
| 6,056,329 | * | 5/2000 | Kitani et al. .......................... 285/302 |

\* cited by examiner

*Primary Examiner*—James Hook
(74) *Attorney, Agent, or Firm*—Knobbe, Martens, Olson & Bear, LLP

(57) ABSTRACT

An expansion tube joint of the present invention comprises a first cylindrical body, a second cylindrical body inserted along an axis of the first cylindrical body, a seal member mounted between the first and second cylindrical bodies closer to an insertion port of the first cylindrical body, a lock mechanism provided at a position deeper than the seal member for restricting a relative movement range along the axis of the first and second cylindrical bodies, and a coming-out preventing member for preventing the seal member from coming out from the insertion port of the first cylindrical body, wherein after a member constituting the lock mechanism is mounted, the seal member can be mounted.

8 Claims, 11 Drawing Sheets

(e)

(f)

(g)

(h)

EXPANSION TUBE JOINT AND ASSEMBLING METHOD THEREOF

BACKGROUND OF THE INVENTION

1. Field of the Invention

The present invention relates to an expansion tube joint and an assembling method thereof.

2. Description of the Related Art

Expansion tube joints are widely used in water pipes and the like. There is a conventional expansion tube joint as shown in FIG. 10. This expansion tube joint comprises a first cylindrical body 1, and a second cylindrical body 2 inserted into the first cylindrical body 1 along the axis X thereof A T-shaped rubber ring 3 (corresponding to a seal member) is provided between the first and second cylindrical bodies 1 and 2 (between an inner periphery of the first cylindrical body 1 and an outer periphery of the second cylindrical body 2). The second cylindrical body 2 is extendable relative to the first cylindrical body 1, and the relative movement range in the axial direction X is limited by a lock mechanism in the expanding and contracting direction.

The lock mechanism will be explained. A stopper in the contracting direction comprises an inner wall projection 1a of the first cylindrical body 1, and an outer wall projection 2a of the second cylindrical body 2. A stopper in the extending direction comprises a stopper ring 4 mounted to an insertion port of the first cylindrical body 1 and the outer wall projection 2a. That is, the lock mechanism is formed closer to the insertion port of the first cylindrical body 1, and the seal member is disposed deeper than the lock mechanism.

With this structure, in a state where the second cylindrical body 2 is inserted into the first cylindrical body 1 deepest, the second cylindrical body 2 must have extra length L from the T-shaped rubber ring 3. The reason why the second cylindrical body 2 must have the extra length L is that when the second cylindrical body 2 moves in the extending direction (rightward in FIG. 10) from a state shown in FIG. 10, the seal function by the T-shaped rubber ring 3 must be secured, Since the length of the second cylindrical body 2 must be secure, the length of the expansion tube joint in the axial direction becomes long, the weight is increased, and the size is also increased. Therefore, there is a problem that costs for producing, storing and transferring the expansion tube joint are increased.

The present invention has been accomplished in view of the above circumstances, and it is an object of the present invention to provide a technique capable of shortening the length of the second cylindrical body as compared with the prior art, and capable of reducing the weight and size of the expansion tube joint to reduce the costs.

SUMMARY OF THE INVENTION

To achieve the above object, an expansion tube joint of the present invention comprises a first cylindrical body, a second cylindrical body inserted along an axis of the first cylindrical body, a seal member mounted between the first and second cylindrical bodies closer to an insertion port of the first cylindrical body, a lock mechanism provided at a position deeper than the seal member for restricting a relative movement range along the axis of the first and second cylindrical bodies, and a coming-out preventing member for preventing the seal member from coming out from the insertion port of the first cylindrical body, wherein after a member constituting the lock mechanism is mounted, the seal member can be mounted.

According to this structure, the seal member is mounted closer to the insertion port of the first cylindrical body, and the lock mechanism is disposed at a deep position. In the prior art, a portion of the second cylindrical body to be inserted into the first cylindrical body must have a length shown with L in FIG. 10 in addition to a length of a portion constituting the lock mechanism. However, with the above structure, the length L is unnecessary. As a result, the length of the second cylindrical body can be shortened as compared with the prior art, the weight, size and cost of the expansion tube joint can be reduced. After the member constituting the lock mechanism is mounted, the seal member can be mounted. With this structure, the expansion tube joint of the present invention can be assembled. By providing the seal member closer to the insertion port, the seal member can be prevented from coming out by using the coming-out preventing member.

According to a preferred embodiment, the insertion port of the first cylindrical body is formed with a male or female bayonet type engaging portion, and the coming-out preventing member is also formed with a male or female bayonet type engaging portion which can engage the engaging portion of the insertion port.

With this structure, it is possible to mount the seal member such that it does not come out toward the insertion port by a simple operation that the coming-out preventing member and a bayonet of the first cylindrical body engage each other. Whether the male bayonet type or female bayonet type is used each in the coming-out preventing member and the first cylindrical body can be appropriately chosen.

According to another preferred embodiment, the seal member has a self seal function. The self seal function is a function which is applied in a compressing direction of the seal member to seal the flowing out water when water pressure is applied to the seal member. With this structure, it is possible to reliably exhibit the function as an expansion tube joint.

According to another preferred embodiment, the expansion tube joint further comprises temporarily means which fixes movements of the first and second cylindrical bodies but the fixed state is first released to restore extending and contracting function of the tube joint when an excessive force is applied.

With this structure, the original extending and contracting flexibility can be maintained, the assembling structure of the tube joint is not varied easily during transportation, and a tube joint which is easy to handle can be provided, which is convenient.

To achieve the above object, in a assembling method of an expansion tube joint of the invention comprising a first cylindrical body, a second cylindrical body inserted along an axis of the first cylindrical body, a seal member mounted between the first and second cylindrical bodies, and a lock mechanism provided for restricting a relative movement range along the axis of the first and second cylindrical bodies, the seal member being mounted closer to an insertion port of the first cylindrical body, the lock mechanism being provided at a position deeper than the seal member, the method comprises:

a step (1) for inserting the second cylindrical body into the first cylindrical body along the axis in a state where a member constituting the lock mechanism is mounted to the second cylindrical body, a step (2) for mounting a member constituting the lock mechanism is mounted to the first cylindrical body, a step (3) for mounting the seal member closer to the insertion port of the first cylindrical body, and a step (4) for mounting a coming-out preventing member for preventing the seal member from coming out from the insertion port.

This assembling method of the expansion tube joint of this structure includes the steps (1) to (4). In this expansion tube joint used in the assembling method, the seal member is mounted closer to the insertion port of the first cylindrical body, and the lock mechanism is disposed at a deep position. In the prior art, a portion of the second cylindrical body to be inserted into the first cylindrical body must have a length shown with L in FIG. 10 in addition to a length of a portion constituting the lock mechanism. However, with the above structure, the length L is unnecessary as described above. As a result, the length of the second cylindrical body can be shortened as compared with the prior art, the weight, size and cost of the expansion tube joint can be reduced.

According to a preferred embodiment, when the seal member is mounted, a jig for defining an insertion amount of the seal member from the insertion port of the first cylindrical body is used.

When the expansion tube joint is assembled, the member constituting the lock mechanism is assembled first and then, the seal member is inserted from the insertion port, but in such a case, the seal member must be assembled to an appropriate position within the first cylindrical body. Thereupon, if the insertion amount from the insertion port can be defined using the jig, it is possible to reliably assemble the seal member to the appropriate position.

DETAILED DESCRIPTION OF THE PREFERRED EMBODIMENTS

Preferred embodiments of expansion tube joint according to the present invention will be explained in detail using the drawings.

The First Embodiment of the Invention

Figure 1A:
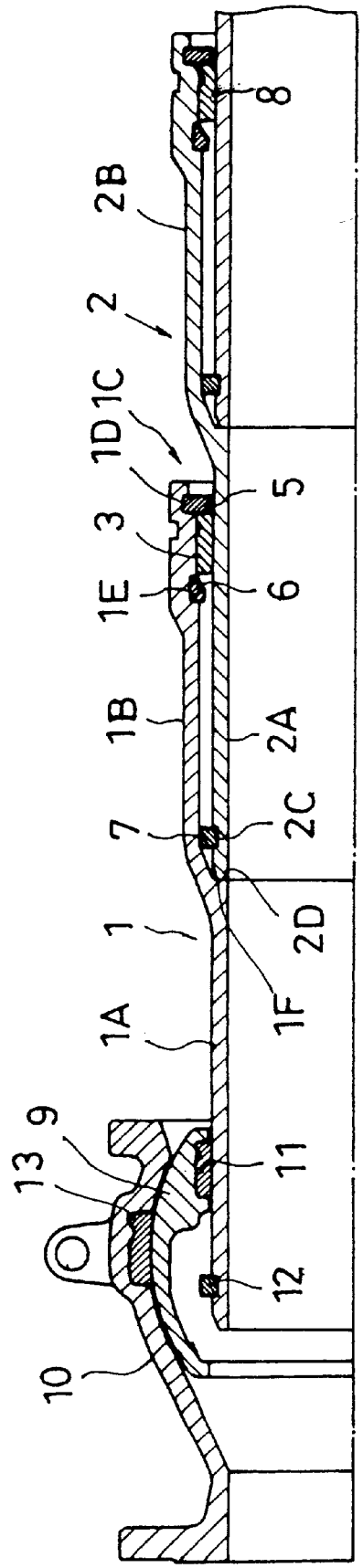
FIGS. 1(a) and 1(b) are half sectional views showing an expansion tube joint according to a first embodiment.

FIGS. 1(a) and (b) show a partial sectional structure of an expansion tube joint according to the first embodiment. A first cylindrical body 1 includes a hollow cylindrical shape along its axis X, and comprises a small diameter cylindrical portion 1A and a large diameter cylindrical portion 1B. A first groove 1D for mounting a bayonet ring 5 (corresponding to a coming-out preventing member) is formed in the vicinity of an insertion port 1C of the large diameter cylindrical portion 1B. A second groove 1E for mounting a first lock-ring 6 is formed at a deep portion of an insertion port 1C of the large diameter cylindrical portion 1B. Like the first cylindrical body 1, a second cylindrical body 2 has also a hollow cylindrical shape, and comprises a small diameter cylindrical portion 2A and a large diameter cylindrical portion 2B. The second cylindrical body 2 is formed at its tip end with a third groove 2C for mounting a second lock-ring 7.

Figure 1B:
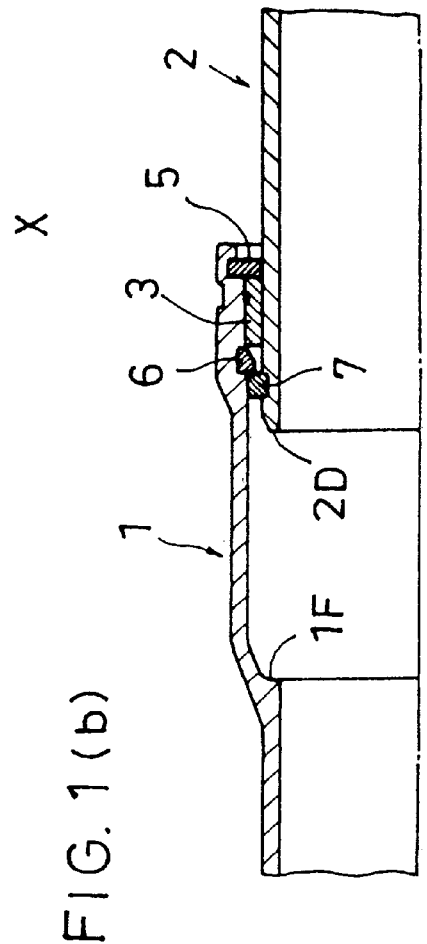

FIG. 1(a) shows a state where the second cylindrical body 2 is inserted (contracted) into the first cylindrical body 1 deepest, and a tip end surface 2D of the second cylindrical body 2 abuts against a standing wall 1F on an inner surface of the first cylindrical body 1, thereby preventing the second cylindrical body 2 from being inserted further. FIG. 1(b) shows a state where the second cylindrical body 2 is pulled out (extended) from the first cylindrical body 1, and the first and second lock-rings 6 and 7 are brought into abutment against each other, thereby preventing the second cylindrical body 2 from coming out. These tip end surface 2D, the standing wall 1F, the first and second lock-rings 6 and 7 function as lock mechanisms for limiting the relative movement range of the first and second cylindrical bodies 1 and 2 in the axial direction X.

Figure 2A:
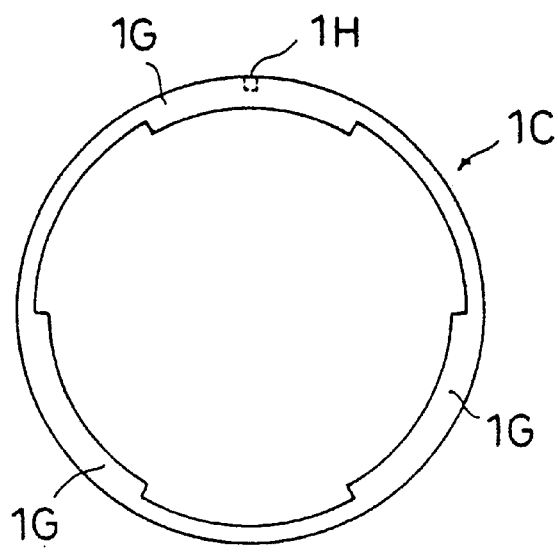
FIGS. 2(a) and 2(b) are views showing the structure of a bayonet.
Figure 2B:
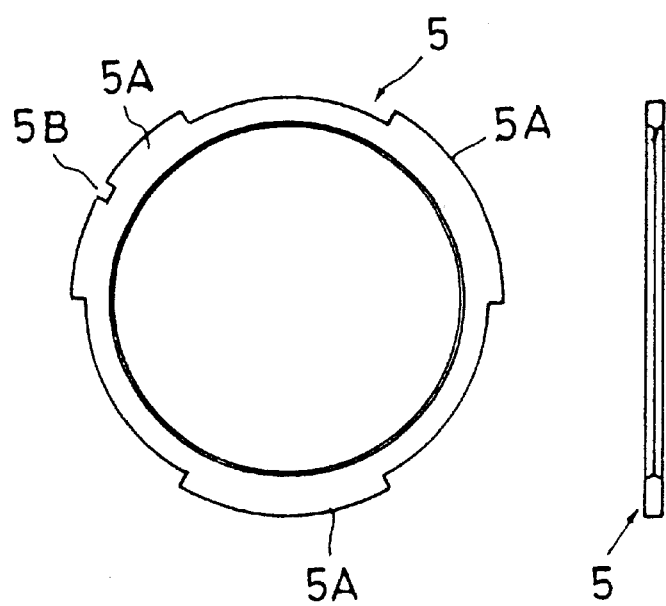

The bayonet ring 5 will be explained with reference to FIGS. 2(a) and 2(b). As can be seen on the left side of FIG. 2(b), the bayonet ring 5 is formed at its three portions with three bayonet claws 5A in the circumferential direction. The insertion port 1C of the first cylindrical body 1 is formed as shown in FIG. 2(a), and is formed at its three portions with three bayonet claws 1G in the circumferential direction. If the bayonet ring 5 is inserted in the insertion port 1C and rotated through a predetermined angle from the phase state shown in FIGS. 2, the bayonet claws 5A and 1G engage each other to prevent the T-shaped rubber ring 3 from coming out from the insertion port 1C. That is, the bayonet ring 5 functions as a coming-out preventing member for preventing a seal member (T-shaped rubber ring 3) from coming out from the insertion port 1C. After the bayonet ring 5 is inserted, if a screw is inserted in a groove 5B of the bayonet ring 5 from a female screw portion 1H formed at an upper portion of the insertion port 1C, the bayonet ring 5 is fixed. The T-shaped rubber ring 3 has a self seal function, and if water pressure is applied, the T-shaped rubber ring 3 operates in a direction to further compress. With this, even when great water pressure is applied, water leakage can be prevented reliably.

As shown in FIG. 1, a third cylindrical body 8 is inserted to the second cylindrical body 2, and the relation between the second and third cylindrical bodies 2 and 8 is the same as that between the first and second cylindrical bodies 1 and 2.

The small diameter cylindrical portion 1A of the first cylindrical body 1 is inserted in an inner surface of a spherical tube joint 9, and the spherical tube joint 9 is inserted in a partial spherical tube joint 10. A rubber ring 11 which is a seal member is provided between the spherical tube joint 9 and the first cylindrical body 1. A lock-ring 12 for limiting the moving amount in extending and contracting direction is provided around a tip end of the small diameter cylindrical portion 1A of the first cylindrical body 1. A rubber ring 13 which is a seal member is provided also between the spherical tube joint 9 and the partial spherical tube joint 10.

Assembling Method of Expansion Tube Joint

Next, an assembling method of the expansion tube joint shown in FIG. 1 will be explained with reference to FIGS. 3 and 4.

Figure 3A:
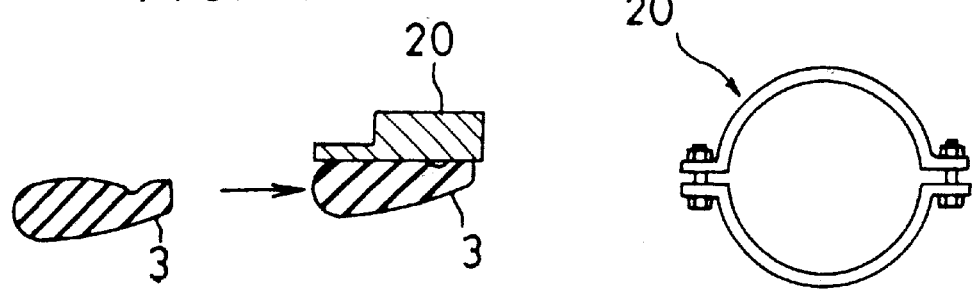
FIGS. 3(a) to 3(d) are partial sectional views for explaining an assembling method of the expansion tube joint according to the first embodiment.
Figure 3B:
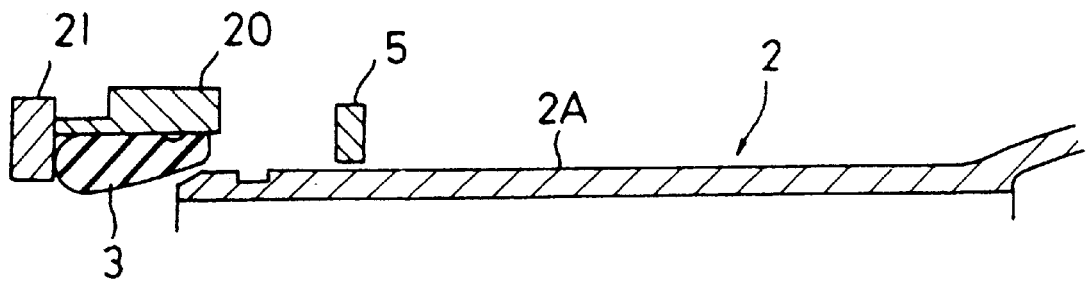

As shown in FIG. 3(a), the T-shaped rubber ring 3 is inserted in the inner surface of the first jig 20. A width of the first jig 20 is set slightly wider than that of the T-shaped rubber ring 3. The sectional view of the first jig 20 is shown in the middle drawing of FIG. 3(a), but as shown in the right drawing of FIG. 3(a), the first jig 20 is a ring divided into two pieces. The T-shaped rubber ring 3 is also formed into a ring shape. As shown in FIG. 3(b), the bayonet ring 5 is inserted into the small diameter cylindrical portion 2A of the second cylindrical body 2 and then, the first jig 20 and the T-shaped rubber ring 3 are inserted into the small diameter cylindrical portion 2A using a second jig 21 which is a pushing jig. The second jig 21 is formed into a ring shape.

Figure 3C:
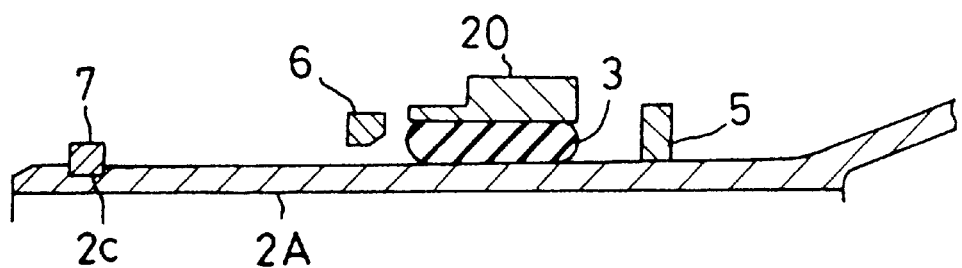
Figure 5:
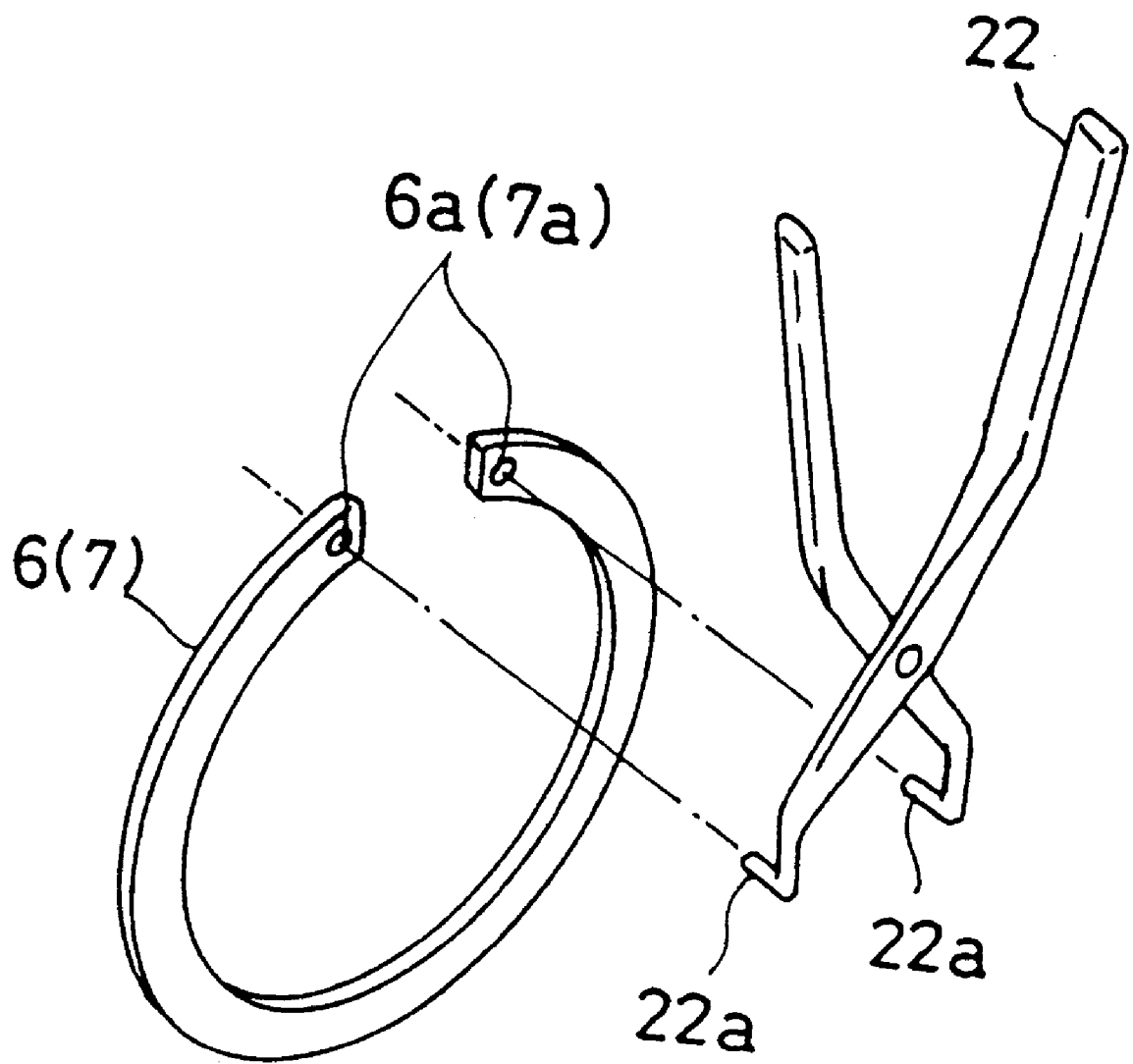
FIG. 5 is a view showing a lock-ring and an assembling jig.

If the first jig 20 and the T-shaped rubber ring 3 are inserted to a predetermined position, the second jig 21 is unnecessary. Next, as shown in FIG. 3(c), the first lock-ring 6 is inserted, and the second lock-ring 7 is mounted to the third groove 2C of the small diameter cylindrical portion 2A. As shown in FIG. 5, the second lock-ring 7 is formed into a C-shape, and the second lock-ring 7 can be mounted to the third groove 2C using a third jig 22. That is, if a tip end 22a of the third jig 22 is inserted in a hole 7a of the second lock-ring 7 to enlarge its inner diameter, the second lock-ring 7 can be inserted into the small diameter cylindrical portion 2A.

Figure 3D:
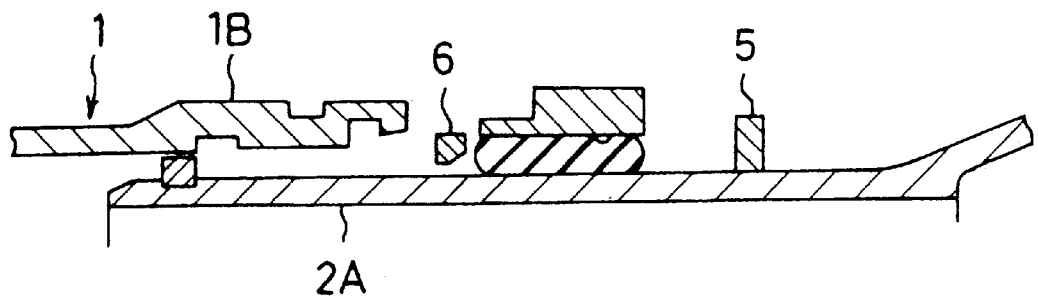

Next, as shown in FIG. 3(d), the large diameter cylindrical portion 1B of the first cylindrical body 1 is inserted. Next, the first lock-ring 6 is mounted to the second groove 1E of the first cylindrical body 1 using the third jig 22. The first lock-ring 6 can be mounted to the second groove 1E in such a manner that the tip end 22a of the third jig 22 is inserted into a hole 6a of the first lock-ring 6 to reduce its inner diameter, and in this state, and the tip end 22a is inserted inside the large diameter cylindrical portion 1B, and the diameter of the tip end 22a is enlarged at the position of the second groove 1E (FIG. 4(e)).

Figure 4A:
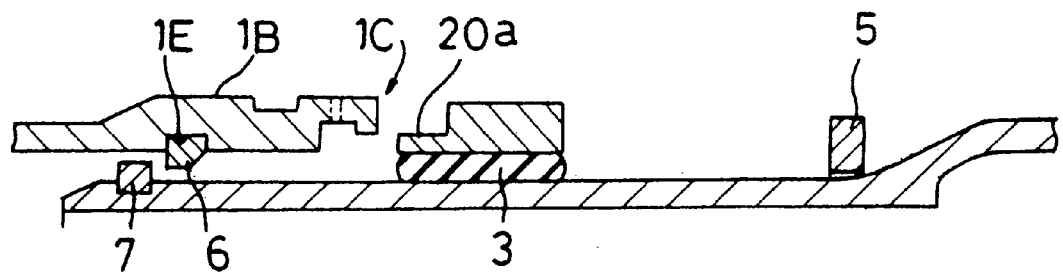
FIGS. 4(A) to 4(H) are partial sectional views for explaining an assembling method of the expansion tube joint according to the first embodiment.
Figure 4B:
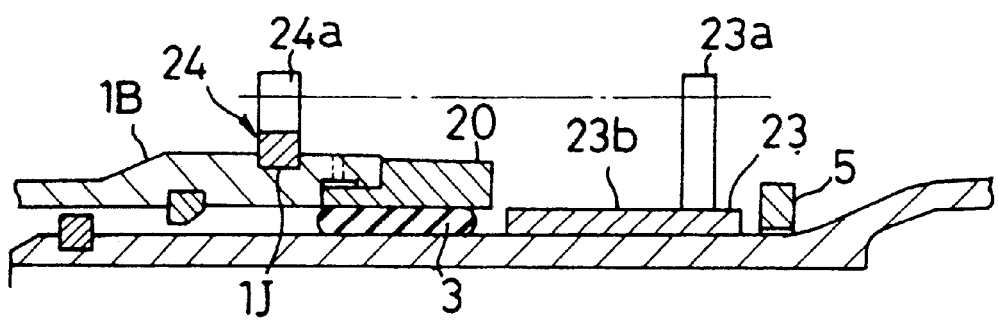
Figure 4C:
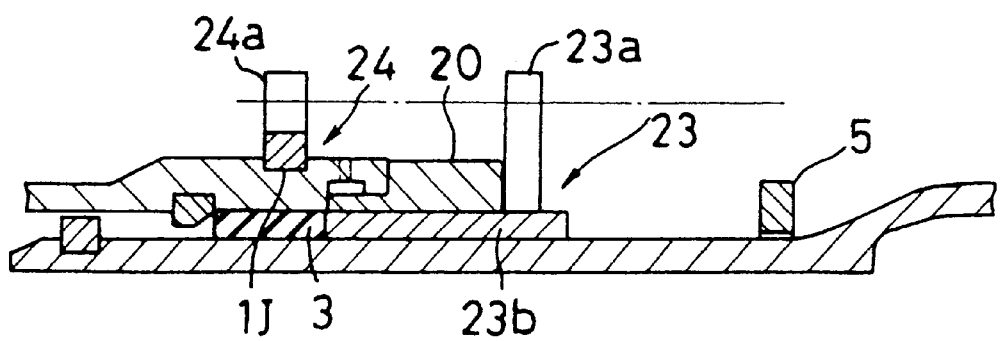
Figure 4D:
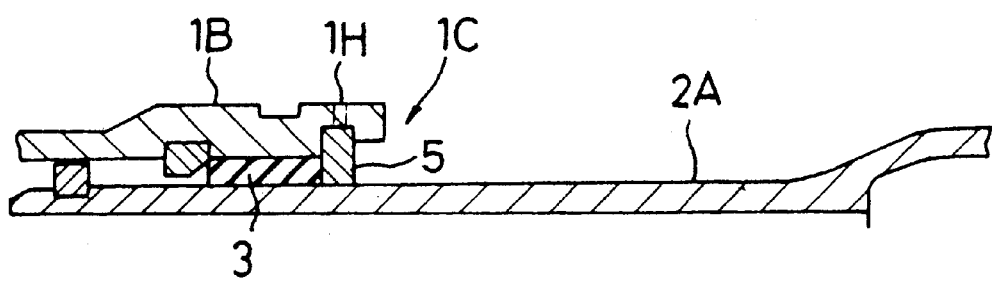
Figure 4:
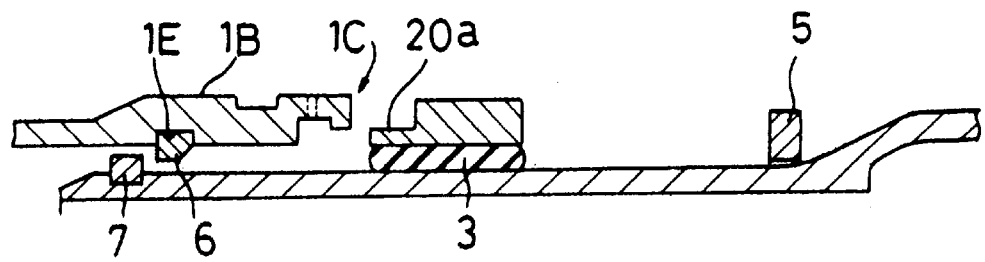
Figure 4:
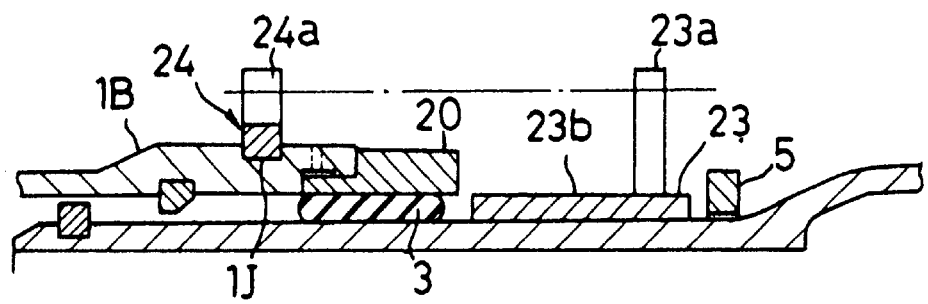
Figure 4:
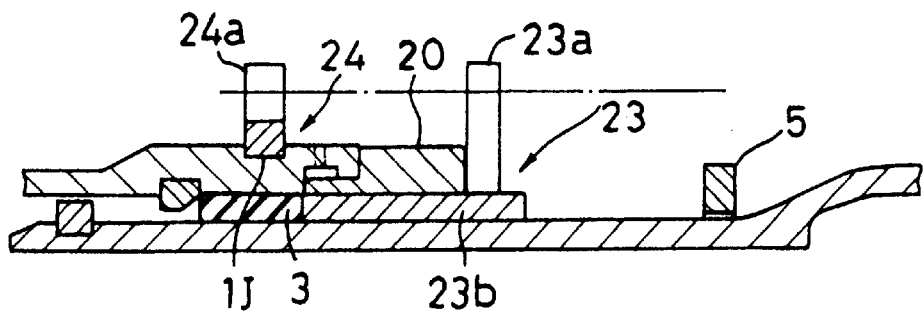
Figure 4:
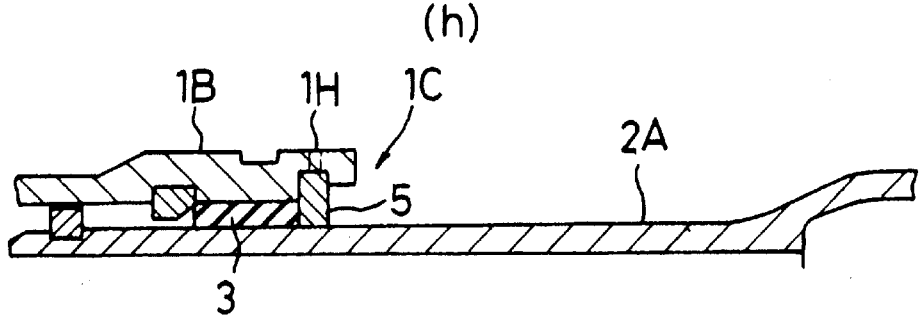

Next, as shown in FIG. 4(f), the tip end 20a of the first jig 20 is inserted from the insertion port 1C. As apparent from FIG. 4(f), an inner surface of the first jig 20 and an inner surface of the large diameter cylindrical portion 1B are substantially flush with each other. Then, a fourth jig 23 is set. The fourth jig 23 includes boss portions 23a and an pushing portion 23b. The pushing portion 23b is formed into a ring shape divided into two pieces. The several boss portions 23a are provided in the circumferential direction.

A fifth jig 24 is set in an outer peripheral groove 1J formed in the large diameter cylindrical portion 1B of the first cylindrical body 1. The fifth jig 24 is also formed into a ring shape divided into two pieces, and several boss portions 24a are provided in the circumferential direction. Bolts are mounted to the boss portions 23a and 24a to pull the fourth jig 23 toward the fifth jig 24. With this operation, the pushing portion 23b inserts the T-shaped rubber ring 3 into the large diameter cylindrical portion IB. When the fourth jig 23 is pulled up to a position where it abuts against the first jig 20, the pushing operation (mounting operation) of the T-shaped rubber ring 3 is completed. That is, the pushing amount is restricted by the first and fourth jigs 20 and 23 (FIG. 4(g)).

Next, the first, fourth and fifth jigs 20, 23 and 24 are removed. Finally, the bayonet ring 5 is mounted to the insertion port 1C to prevent the T-shaped rubber ring 3 from coming out. Lastly, the screw is fastened from the female screw portion 1H, thereby fixing the bayonet ring 5. With this operation, the assembling of the expansion tube joint is completed.

As described above, the T-shaped rubber ring 3 is provided close to the insertion port 1C of the first cylindrical body 1, and the parts (such as the first lock-ring 6) constituting the lock mechanism is incorporated at positions deeper than the T-shaped rubber ring 3. With this design, the length of the second cylindrical body 2 can be shortened as compared with the prior art.

The Second Embodiment of the Invention

Figure 6:
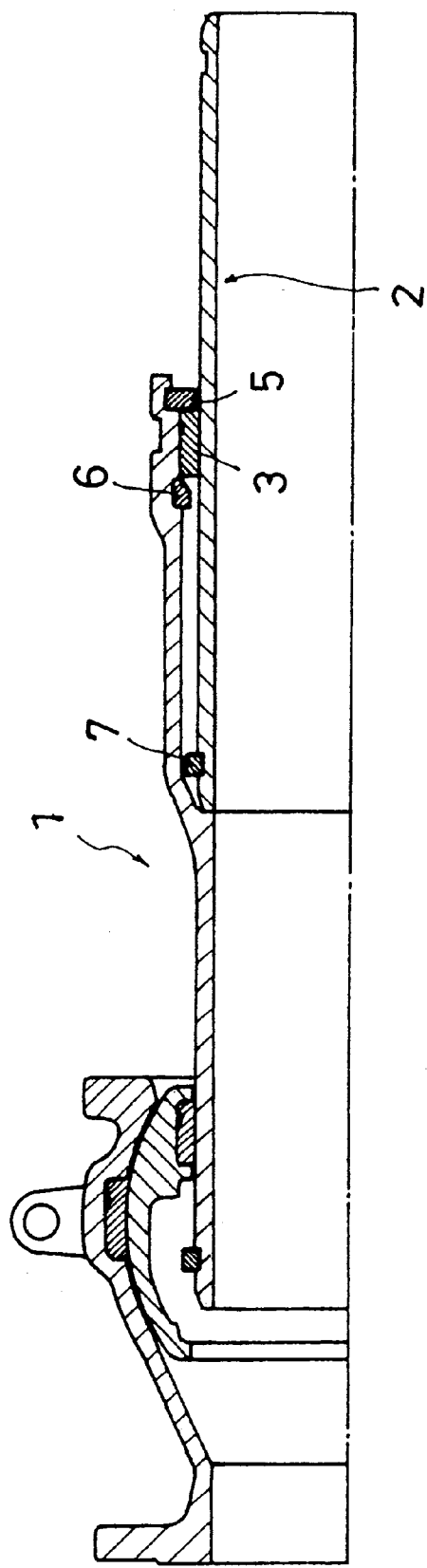
FIG. 6 is a half sectional view showing an expansion tube joint according to a second embodiment.

FIG. 6 shows an expansion tube joint of the second embodiment. Members having the same functions as those in the first embodiment are designated by the same reference symbols. The second embodiment is different from the first embodiment in that the second cylindrical body 2 has a straight hollow cylindrical shape. When this expansion tube joint is assembled, each of the first and fourth jigs 20 and 23 need not be formed into the ring shape divided into two pieces, and may be formed into an endless ring shape. This is because the first and fourth jigs 20 and 23 after assembled can be pulled rightward from the second cylindrical body 2 as viewed in FIG. 6. The bayonet ring 5 can be inserted from right in FIG. 6 after the jigs 20 and 23 are pulled out.

The Third Embodiment of the Invention

Figure 7:
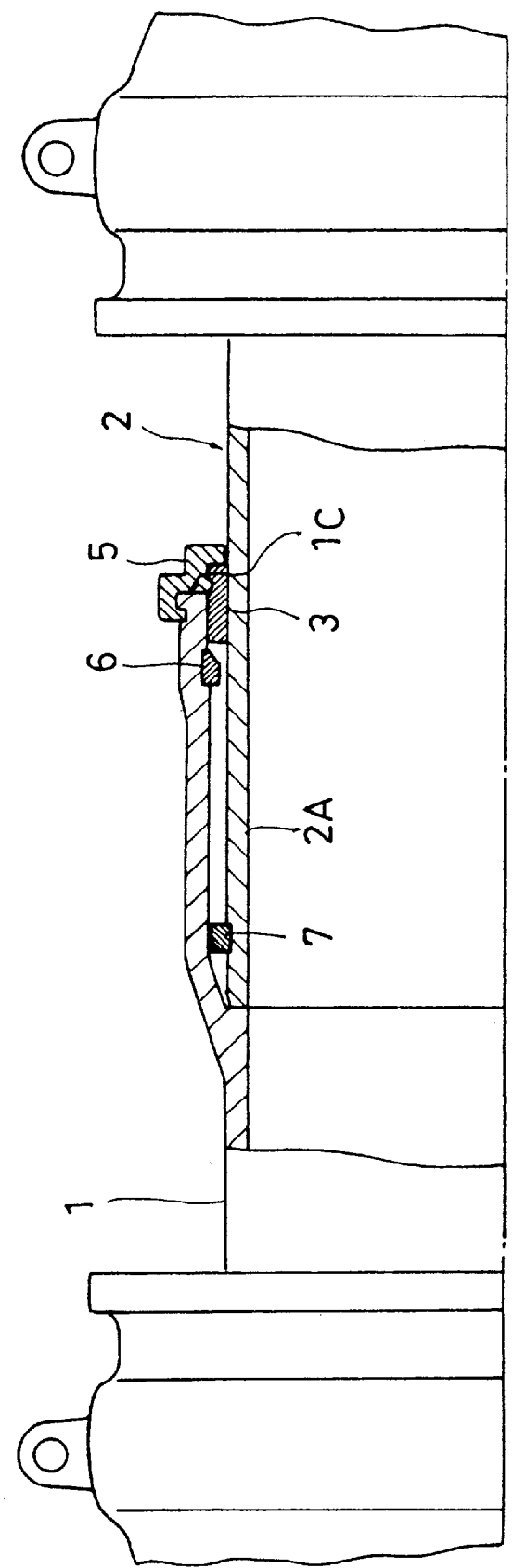
FIG. 7 is a half sectional view showing an expansion tube joint according to a third embodiment.

FIG. 7 shows an expansion tube joint of the third embodiment. Members having the same functions as those in the first embodiment are designated by the same reference symbols. In this embodiment, the structure of the bayonet ring 5 is different. In the first and second embodiments, the insertion port 1C is the female bayonet, and the bayonet ring 5 is a combination of male bayonet. In the third embodiment, the insertion port 1C is a male bayonet, and the bayonet ring 5 is a combination of female bayonet. The assembling method may be the same as that of the first embodiment.

The Fourth Embodiment of the Invention

Figure 8:
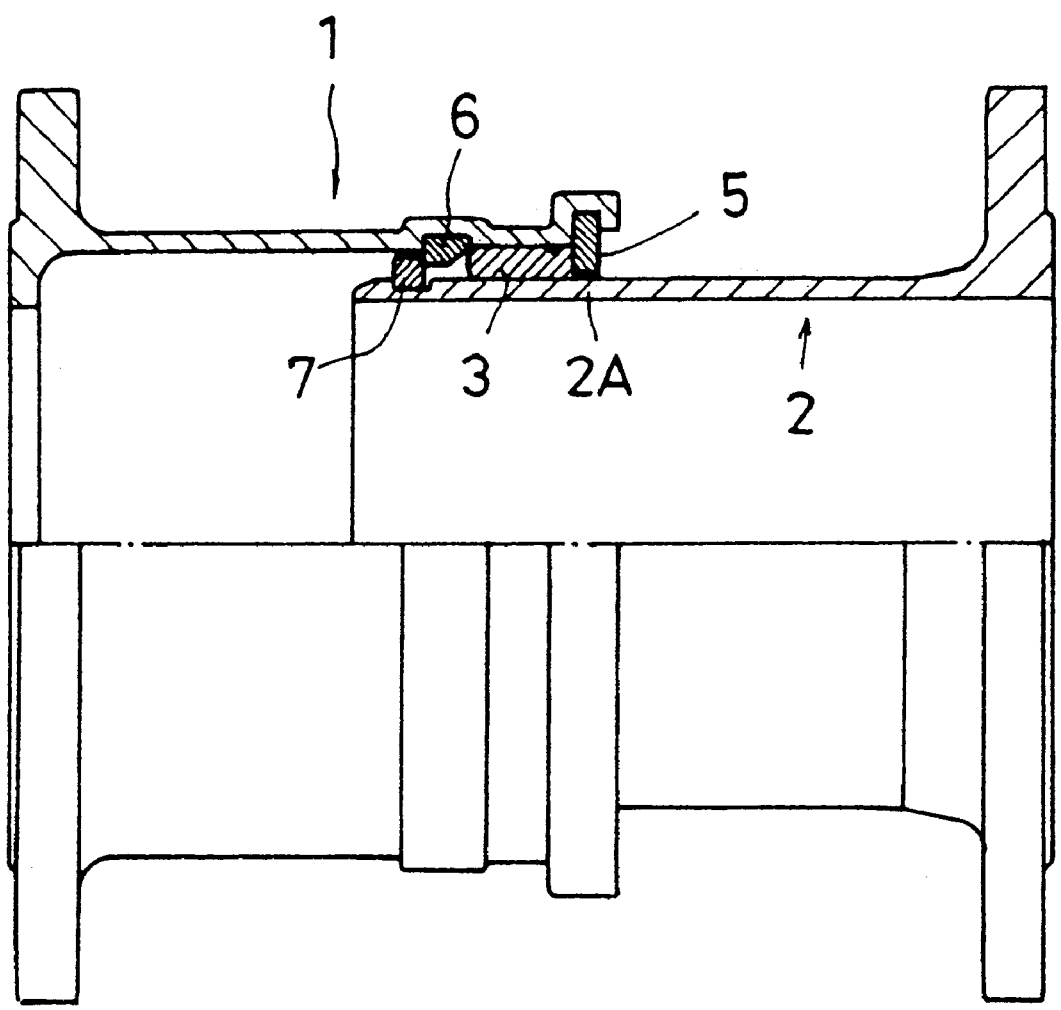
FIG. 8 is a partial sectional view showing an expansion tube joint according to a fourth embodiment.

An expansion tube joint of the fourth embodiment shown in FIG. 8 is used in a valve chamber of a distribution reservoir, or in a water pipe bridge. Also when a size between surfaces is adjusted for providing this expansion tube, the present invention can be applied. In FIG. 8, members having the same functions as those in the first embodiment are designated by the same reference symbols.

The Fifth Embodiment of the Invention

Figure 9:
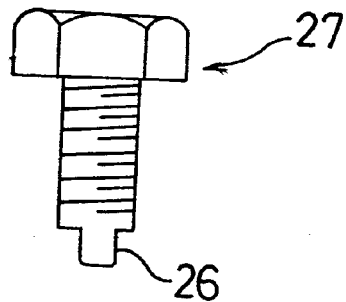
FIGS. 9(a) to 9(c) are views showing an expansion tube joint according to a fifth embodiment.
Figure 9:
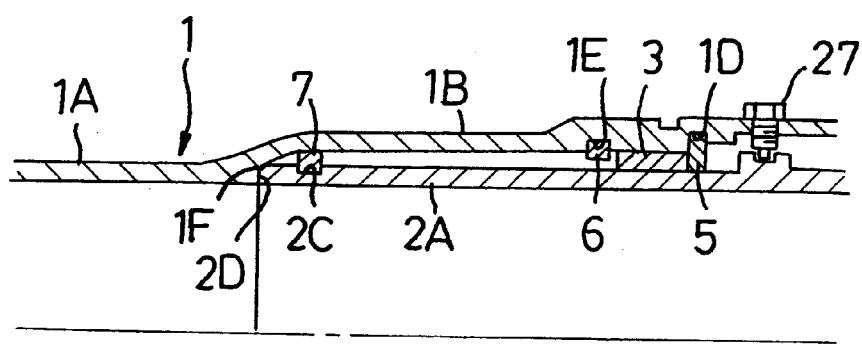
Figure 9:
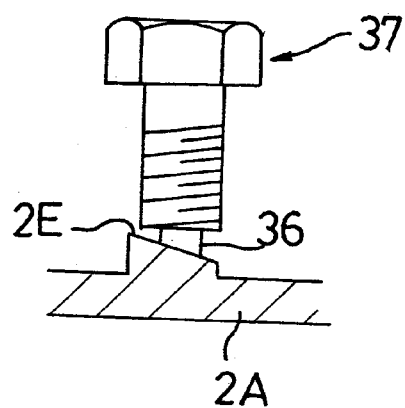
Figure 10:
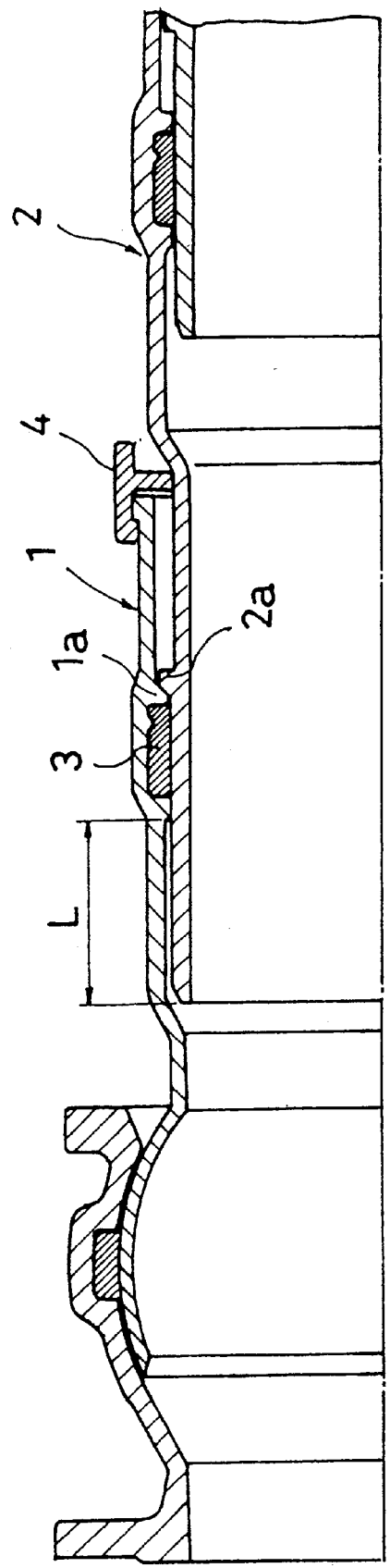
FIG. 10 is a half sectional view showing a conventional expansion tube joint.

FIGS. 9(a) and 9(b) show an expansion tube joint of the fifth embodiment. As shown in FIG. 9(a), movable members of various members constituting the expansion tube joint are temporarily fixed to each other by a notched screw 27 which is temporarily fixing means which is formed at its tip end with a small diameter portion 26 by notching. That is, since the expansion tube joint has the expansion function, the expansion tube joint has excellent function to flexibly move with respect to diastrophism such as earthquake. However, movable members constituting the expansion tube joint are unintentionally extended or retracted on its way to a work site. Therefore, even if the various members are previously assembled in a workshop, it is necessary to assemble and adjust the expansion tube joint again in the work site and thus, the work efficiency is deteriorated. Until the expansion tube joint is installed in the work site such as on its way to the work site, it is convenient that the expansion tube joint does not expand and retract. Thereupon, when great external force is applied, the original expanding and retracting function is exhibited, but unless the great external force is applied, it is convenient that a plurality of notched screw 27 having weak portions are provided so that the various members constituting the expansion tube joint do not move.

Further, if the expansion tube joint is fixed using such notched screw 27, the following merits can also be obtained. That is, when a tube in the vicinity of a constructed expansion tube joint is bent, unbalance force is applied to such bent portion by water flow, and the expansion tube joint is extended in some cases. If the expansion tube joint is extended by normal water flow, the tolerance of extending and contracting motion is consumed, and when crustal fluctuation, etc. is generated, there is a possibility the extending and contracting function may not be exhibited. However, if the notched screw 27 for temporarily preventing the extending and contracting motion is used, it is convenient that such a possibility is overcome. When the unbalance force or greater force is applied to the tube joint, the original extending and contracting function is exhibited.

More specifically, as shown in FIG. 9(b), several notched screws 27 are fixed to several portions of the first cylindrical body 1 in its circumferential direction for temporarily fixing the first and second cylindrical bodies 1 and 2. Although it is not illustrated, it is convenient if further notched screws 27 are used to fix between the second and third cylindrical bodies 2 and 8, and between the spherical tube joint 9 and the partial spherical tube joint 10 similarly. The positions where the notched screws 27 are fixed can be selected appropriately. By using the notched screws in this manner, the original extending and contracting flexibility can be maintained, the assembling structure of the tube joint is not varied easily during transportation, and a tube joint which is easy to handle can be provided, which is convenient.

The entire shape of the notched screw 27, the shape of the small diameter notch portion 26 and positions thereof are not limited to those shown in FIG. 9(a), and various modifications (e.g., wedge or like) can be employed. Further, a notched screw 37 as shown in FIG. 9(c) may be fixed. This notched screw 37 has a small diameter notch portion 36 whose tip end portion is formed into an inclined flat surface. The inclined flat surface can abut against an inclined portion 2E on the projection surface formed on the small diameter cylindrical portion 2A of the second cylindrical body 2. When an external force is applied to the abutment surface between the inclined portion 2E and the notch portion 36, a force is applied in a direction in which the abutment surfaces relatively move, and if the external force is small, both the fixed state of the members is maintained, but a great external force is applied, the abutment of both the members is released or the members are destroyed, and in any cases, the fixed state is released by a great external force. It is possible to determine the degree of force by which the fixed state is released by appropriately adjusting the abutment surface area or inclining angle of the abutment position.

What is claimed is:

1. An expansion tube joint comprising
a first cylindrical body,
a second cylindrical body inserted along an axis of said first cylindrical body,
a seal member mounted between said first and second cylindrical bodies closer to an insertion port of said first cylindrical body,
a lock mechanism provided at a position deeper than said seal member for restricting a relative movement range along said axis of said first and second cylindrical bodies, and
a coming-out preventing member for preventing said seal member from coming out from said insertion port of said first cylindrical body,
wherein after a member constituting said lock mechanism is mounted, said seal member can be mounted,
a male or female bayonet engaging portion is formed on said insertion port of said first cylindrical body,
another male or female bayonet encasing portion capable of engaging said former male or female bayonet engaging portion is formed also on said coming-out preventing member.

2. An expansion tube joint according to claim 1, wherein said insertion port of said first cylindrical body is formed with a male or female bayonet type engaging portion, and
said coming-out preventing member is also formed with a male or female bayonet type engaging portion which can engage said engaging portion of said insertion port.

3. An expansion tube joint according to claim 1, wherein said seal member has a self seal function.

4. An expansion tube joint according to claim 1, wherein said seal member has a self seal function, and said expansion tube joint further comprises a temporarily fixing member which fixes movements of said first and second cylindrical bodies but the fixed state is first released to restore extending and
contracting function of said tube joint when an excessive force is applied.

5. An expansion tube joint comprising
a first cylindrical body,
a second cylindrical body inserted along an axis of said first cylindrical body,
a seal member mounted between said first and second cylindrical bodies closer to an insertion port of said first cylindrical body,
a lock mechanism provided at a position deeper than said seal member for restricting a relative movement range alone said axis of said first and second cylindrical bodies, and
a coming-out preventing member for preventing said seal member from coming out from said insertion port of said first cylindrical body,
wherein after a member constituting said lock mechanism is mounted, said seal member can be mounted,
said expansion tube joint further comprises a temporarily fixing member,
said temporarily fixing member locks movable states of said first and second cylindrical bodies, but when excessive external force is applied, said temporarily fixing member unlock the movable sate to restore expansion ability.

6. An assembling method of an expansion tube joint comprising a first cylindrical body, a second cylindrical body inserted along an axis of said first cylindrical body, a seal member mounted between said first and second cylindrical bodies, and a lock mechanism for restricting a relative movement range along said axis of said first and second cylindrical bodies, said seal member being mounted closer to an insertion port of said first cylindrical body, said lock mechanism being provided at a position deeper than said seal member, said method comprising steps of:
inserting said second cylindrical body into said first cylindrical body along said axis in a state where a member constituting said lock mechanism is mounted to said second cylindrical body, mounting a member constituting said lock mechanism to said first cylindrical body, mounting said seal member closer to said insertion port of said first cylindrical body, and mounting a coming-out preventing member for preventing said seal member from coming out from said insertion port, wherein a male or female bayonet engaging portion formed on said insertion port of said first cylindrical body and a male or female bayonet engaging portion formed on said coming-out preventing member and capable of engaging said former bayonet engaging portion of said first cylindrical body are engaged with each other to prevent said seal member from coming out from said insertion hole.

7. An assembling method of an expansion tube joint according claim 6, wherein when said seal member is mounted, a jig for defining an insertion amount of said seal member from said insertion port of said first cylindrical body is used.

8. An assembling method of an expansion tube joint comprising a first cylindrical body, a second cylindrical body inserted along an axis of said first cylindrical body, a seal member mounted between said first and second cylindrical bodies, and a lock mechanism for restricting a relative movement range along said axis of said first and second cylindrical bodies, said seal member being mounted closer to an insertion port of said first cylindrical body, said lock mechanism being provided at a position deeper than said seam ember, said method comprising steps of:

inserting said second cylindrical body into said first cylindrical body along said axis in a state where a member constituting said lock mechanism is mounted to said second cylindrical body, mounting a member constituting said lock mechanism to said first cylindrical body, mounting said seal member closer to said insertion port of said first cylindrical body, mounting a coming-out preventing member for preventing said seal member from coming out from said insertion port, and mounting a temporarily fixing member for temporarily fixing said first and second cylindrical bodies to each other.

* * * * *